W. C. GARNER.
HEATER.
APPLICATION FILED SEPT. 25, 1920.
1,396,104.
Patented Nov. 8, 1921.
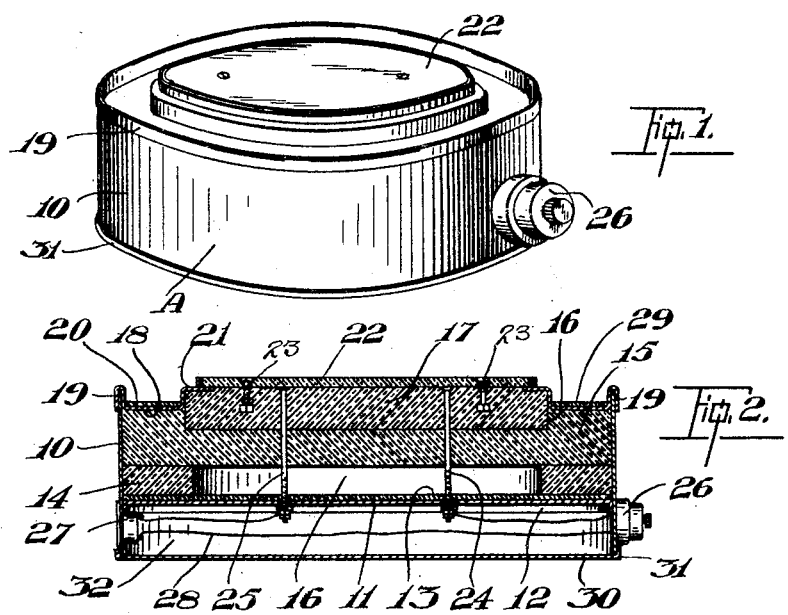
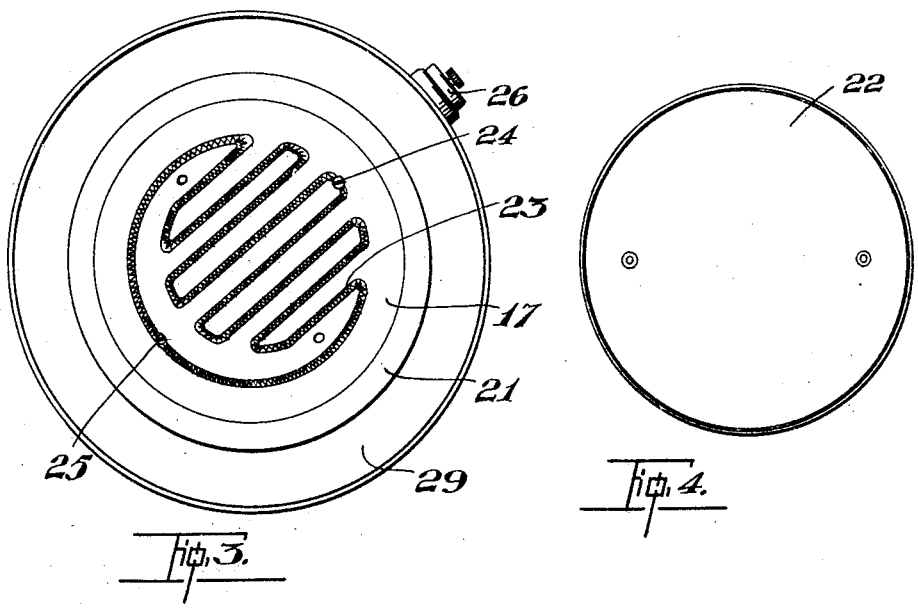
INVENTOR
WELBORN C. GARNER.

UNITED STATES PATENT OFFICE.

WELBORN CLAY GARNER, OF EDMONTON, ALBERTA, CANADA.

HEATER.

1,396,104.  Specification of Letters Patent.  Patented Nov. 8, 1921.

Application filed September 25, 1920. Serial No. 412,802.

*To all whom it may concern:*

Be it known that I, WELBORN CLAY GARNER, a subject of the King of Great Britain, a resident of the city of Edmonton, Province of Alberta, Dominion of Canada, have invented certain new and useful Improvements in Heaters, of which the following is a specification.

This invention relates to improvements in heaters designed for use on cookers, water-heaters and other similar appliances, and the objects of the invention are to so construct the heater that the heat will be stored in a retaining and storage member, and properly applied to the object or article being heated, to arrange the several parts of the heater so that there will be a minimum of loss either by conduction, radiation or convection, and to permit of the several parts being readily accessible for inspection.

Further objects are to so construct the heat retaining member of the heater to inclose an electrical resistance, and prevent currents of air passing across the same, the resistance being to all practical purposes hermetically sealed or inclosed, and generally to adapt the several parts to better perform the functions required of them.

With the above and other objects in view the invention consists essentially of the improved construction and arrangement of parts particularly described and set forth in the following specification and accompanying drawings forming part of the same.

In the drawings:

Figure 1 is a perspective view of my improved heater.

Fig. 2 is a vertical section of the same.

Fig. 3 is a plan view of the heater having the top section of the heat retaining and storage member removed to show the electrical resistance.

Fig. 4 is a plan view of the top portion of the heat retaining and storage member.

Like characters of reference refer to like parts in the several figures.

The resistance element used in the invention is of the type shown in my co-pending application No. 412,803.

Referring to the drawings; A represents my improved heater comprising a casing 10, which is formed of suitable material and is provided intermediate of its height with a transversely extending wall 11 provided with a depending flange 12, which may be secured to the casings by any suitable means.

Above the wall 11, a sheet of heat non-conducting material 13 is positioned, and above this sheet a ring 14 also of heat non-conducting material is located. A block 15 of heat non-conducting material is now placed on the ring 14 so that a dead air compartment 16 is formed in the body of the heater.

The upper wall of the block 15 is formed with a recess 16 in which a heat storage and retaining member 17 fits.

A cover 18 is provided having a curled outer edge 19 which embraces the upper edge of the casing 10 and this cover is formed with a recess 20 and the inner edge 21 overhangs the periphery of the heat retaining and storage member 17.

The heat retaining and storage member has an upper section 22, and between the member 17 and the member 22 an electrical resistance 23 is positioned and inclosed. Posts 24 and 25 are connected to the electrical resistance 23 and the post 24 is connected with a switch 26 while the post 25 is connected to a socket 27. The socket 27 is then connected by a wire 28 to the switch 26.

In the recess 20 a strip of packing 29 is located and a cover of any suitable material may be placed over the heater to rest on the strip of packing 29, the lower edge of the cover being embraced by the recess 20.

The bottom of the heater is closed by a wall 30 having an annular flange 31 which embraces the lower end of the casing 10, and a dead air compartment 32 is thus formed in the body of the heater. It will be evident that two dead air compartments are provided which will prevent any loss of heat by radiation, and by the use of the non-conducting members 13, 14 and 15, loss of heat by convection will be eliminated.

When the heater is in use, the socket 27 may be connected by suitable wiring to an ordinary light socket commonly found in household lighting installation, and the switch 26 is then turned on, so that current flows through the resistance 23 and heats the same.

The heat from the resistance is absorbed and stored within the heat retaining and storage members 17 and 22. Any article to be heated may be placed upon the storage member 22.

The heater is of an extremely simple nature and the parts are so arranged that they are not liable to go out of repair, and the wiring in the lower compartment of the heater is readily accessible for inspection, while the resistance can also be quickly inspected by removing the member 22.

As many changes could be made in the above construction and many widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. A heater of the character described comprising a casing having a wall intermediate of its height, a ring of heat retaining material above the wall, and a block of heat non-conducting material above the ring to thereby provide an air space at the center of the ring above the wall, and an electric heating means above the block.

2. A heater of the character described comprising a casing having a wall intermediate of its height, a ring of heat retaining material above the wall, and a block of heat non-conducting material above the ring to thereby provide an air space at the center of the ring above the wall, an electric heating means above the block, and a second block above the electric heating means.

3. A heater of the character described comprising a casing having a wall intermediate of its height, a ring of heat retaining material above the wall, and a block of heat non-conducting material above the ring to thereby provide an air space at the center of the ring above the wall, an electric heating means above the block, a second block above the electric heating means, and a cover embracing the said second block.

4. A heater of the character described comprising a casing having a wall intermediate of its height, a ring of heat retaining material above the wall, and a block of heat non-conducting material above the ring to thereby provide an air space at the center of the ring above the wall, an electric heating means above the block, a second block above the electric heating means, a cover embracing the said second block, the said cover being formed on the outer edge with a recess, and a strip of packing in the recess.

5. A heater of the character described comprising a casing having a wall intermediate of its height, a ring of heat insulating material above the wall, a plurality of blocks above the ring, connecting and conducting posts extending through the blocks and through the wall, an electric resistance element connected electrically to the upper ends of the posts.

6. A heater of the character described comprising a casing having a wall intermediate of its height, a ring of heat insulating material above the wall, a plurality of blocks above the ring, connecting and conducting posts extending through the blocks and through the wall, an electric resistance element connected electrically to the upper ends of the posts, and a heat retaining member extending above the resistance element.

In witness whereof I have hereunto set my hand in the presence of two witnesses.

WELBORN CLAY GARNER.

Witnesses:
  JAMES MITCHELL,
  RUBY A. THOMS.